Oct. 6, 1970   E. J. KLINTWORTH   3,532,010
CUTTING TOOL
Filed Sept. 3, 1968
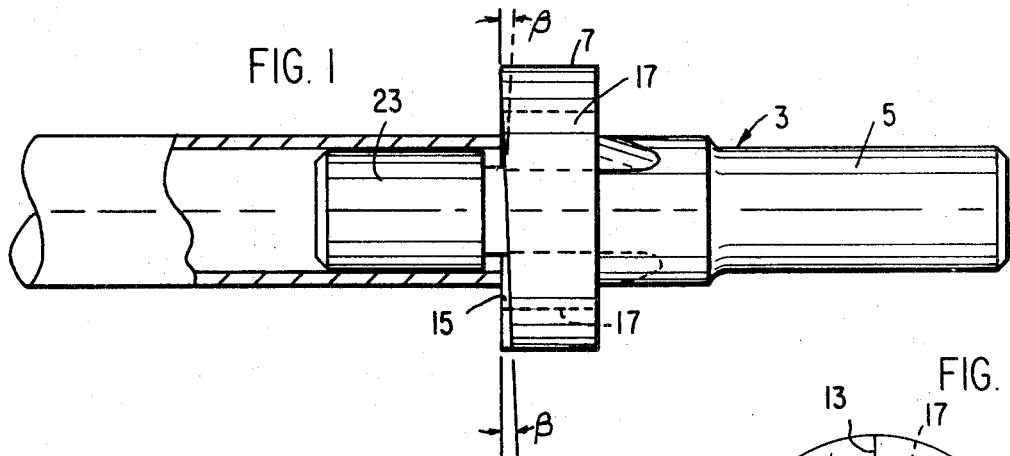
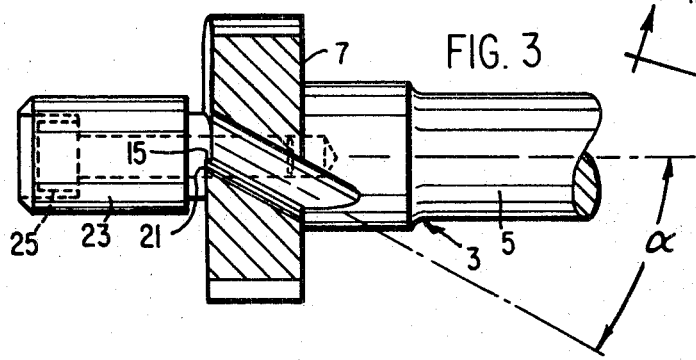
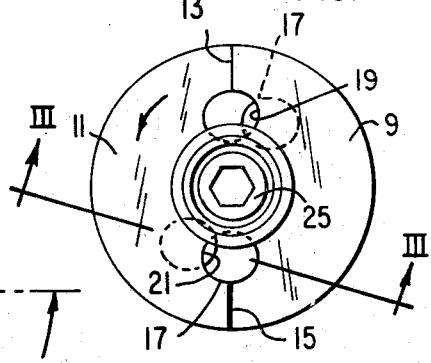
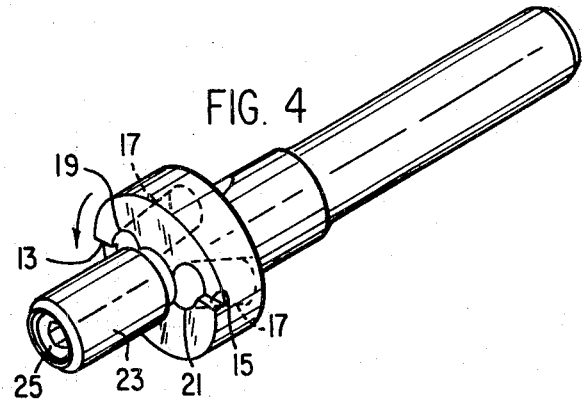
INVENTOR.
EMMET J. KLINTWORTH.
BY *James E. Schardt*
ATTORNEY.

United States Patent Office 3,532,010
Patented Oct. 6, 1970

3,532,010
CUTTING TOOL
Emmet J. Klintworth, Indianapolis, Ind., assignor to Carrier Corporation, Syracuse, N.Y., a corporation of Delaware
Filed Sept. 3, 1968, Ser. No. 756,811
Int. Cl. B23b 5/16
U.S. Cl. 77—73  4 Claims

ABSTRACT OF THE DISCLOSURE

A cutting tool for facing tubing to a desired length and providing a burr-free end thereon. The tool is provided with a pilot to position the tool in relation to the tube and two arcuate cutting edges to remove material from the tube end.

BACKGROUND OF THE INVENTION

In the manufacture of steel plate fin heat exchange coils wherein the plate fins are assembled on thin walled steel tubing which is thereafter expanded into engagement with the plate fins, the expansion process may result in tubes of unequal length. It is desirable that all the expanded tubes of the heat exchanger be the same length to simplify the attachment of the return bends to the tube ends.

SUMMARY OF THE INVENTION

This invention provides a cutting tool for facing tube ends and comprises a shank having a cutting head formed thereon. One half of the cutting head face is disposed at a slight angle from perpendicular to the shank axis while the other half of the face is disposed at a slight angle from perpendicular in the opposite direction from the first half of the face, thus forming two steps in the face of the tool. Two chip removal passages in the tool head having the axes thereof disposed at a 20° to 40° angle from the axis of the tool shank intersect the steps in the tool face to form therewith two semi-circular cutting edges for facing tube ends. A pilot is provided having the axis thereof in alignment with the axis of the tool shank to hold the cutting face of the tool centered with respect to the tube to be faced.

BRIEF DESCRIPTION OF THE DRAWING

FIG. 1 is a partial sectional view of the tube facing tool inserted in a tube to be faced;
FIG. 2 is an end view of the tube facing tool;
FIG. 3 is a view taken along lines III—III of FIG. 2; and
FIG. 4 is a perspective view of the tube facing tool.

DESCRIPTION OF THE PREFERRED EMBODIMENT

Referring to the drawing, there is illustrated a tube facing cutter 3 having a shank portion 5 and a cutting head portion 7. A first half 9 of the cutting head face is disposed at a slight angle $\beta$ from perpendicular to the shank axis. The second half 11 of the cutting head face is disposed at a slight angle $\beta$ from perpendicular to the shank axis in the opposite direction from the first half 9 of the cutting head face. A suitable value for angle $\beta$ is 1°. It can be seen by reference to the drawing that this face configuration provides two steps 13 and 15 separating the two face halves.

Cylindrical chip removal passages 17 in head portion 7, which are disposed at an angle $\alpha$ with the shank axis, intersect steps 13 and 15 to form therewith semi-circular cutting edges 19 and 21. Angle $\alpha$ may range between 20° and 40° depending upon the material to be cut and the cutting speed. An angle of 30° is desirable for use with steel tubing.

The axes of the chip removal passages 17 intersect the face steps at a radius corresponding to the radius of the midpoint of the tube to be cut. The center of the tube wall to be cut is therefore contacted by the deepest portion of the cutting edge while the interior and exterior surfaces of the tube wall are contacted by a portion of the cutting edge which is at a lesser depth. This relationship between the cutting edge and the tube wall minimizes or eliminates the formation of burrs on the machined end of the tube.

A pilot 23, suitably affixed to the cutting head portion of cutter 3 as by bolt 25, is provided to center the cutting tube in relation to the tube to be faced.

In practice it has been found that making these cutters of high speed steel results in a cutter life of approximately 2,000 cuts into welded or annealed steel tubing before resharpening is necessary. The described cutter moreover can be easily sharpened without the use of complicated sharpening equipment. By removing the pilot 23 from the cutter and grinding a small portion of material from the tube face halves, the cutting edges are reconditioned. The width of the cutting head portion of the tool can be reduced substantially by this sharpening method without impairing the cutting efficiency of the tool.

While I have described a preferred embodiment of my invention it is to be understood that the invention is not limited thereto but may otherwise be embodied within the scope of the following claims.

I claim:
1. A cutting tool for facing tube ends comprising a shank, a cutting head formed on said shank, said head having a stepped face generally perpendicular to the axis of said shank, a semi-circular cutting edge formed in the edge of the step, said semi-circular cutting edge having a cutting angle in the range of 20° to 40°.
2. A cutting tool according to claim 1 wherein one half of said face is disposed at a slight angle from perpendicular to the shank axis, the other half of said face being disposed at a slight angle from perpendicular in the opposite direction from the first half of said face, thus providing two angled steps separating said face halves, each of said steps having a semi-circular cutting edge formed therein.
3. A cutting tool according to claim 2 wherein said head includes chip removal passages communicating with said cutting edges.
4. A cutting tool according to claim 2 wherein said chip removal passages are cylindrical, the axes of said passages being disposed at an angle in the range of 20° to 40° from the axis of the tool, said cutting edges being formed by the intersection of said face steps and said cylindrical passages.

References Cited
UNITED STATES PATENTS
3,473,421 10/1969 Grussner _____ 77—73.5
3,402,624 9/1968 Bollito et al. _____ 77—73

FRANCIS S. HUSAR, Primary Examiner

U.S. Cl. X.R.
29—103